(12) United States Patent
Taylor et al.

(10) Patent No.: US 6,634,388 B1
(45) Date of Patent: *Oct. 21, 2003

(54) ANNULAR FLUID MANIPULATION IN LINED TUBULAR SYSTEMS

(75) Inventors: Jack Curtis Taylor, Conroe, TX (US); Max Jerry Roach, Conroe, TX (US)

(73) Assignee: SafetyLiner Systems, LLC, Conroe, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/744,280

(22) PCT Filed: Jul. 22, 1999

(86) PCT No.: PCT/US99/16612

§ 371 (c)(1),
(2), (4) Date: Mar. 22, 2001

(87) PCT Pub. No.: WO00/05506

PCT Pub. Date: Feb. 3, 2000

Related U.S. Application Data

(63) Continuation-in-part of application No. 09/353,300, filed on Jul. 13, 1999, now Pat. No. 6,220,079.
(60) Provisional application No. 60/093,665, filed on Jul. 22, 1998, provisional application No. 60/094,326, filed on Jul. 28, 1998, and provisional application No. 60/138,814, filed on Jun. 14, 1999.

(51) Int. Cl.[7] .................................................. F16L 9/18
(52) U.S. Cl. ..................... 138/114; 138/104; 138/116; 73/49.7; 73/49.5
(58) Field of Search .................. 138/104, 44, 108, 138/112, 114, 115, 116; 73/40.5 R, 49.7, 49.5; 175/25, 38, 48, 96, 215, 217, 218

(56) References Cited

U.S. PATENT DOCUMENTS

| 1,304,036 A | 5/1919 | Eshelby |
| 1,930,285 A | 10/1933 | Robinson |
| 2,280,140 A | 4/1942 | Wilson |
| 2,440,245 A | 4/1948 | Chevigny ................... 250/27.5 |
| 3,184,958 A | 5/1965 | Eaton .......................... 73/40.5 |
| 3,299,417 A | 1/1967 | Sibthorpe ................... 340/242 |
| 3,339,415 A | 9/1967 | Wild ........................... 73/40.5 |
| 3,471,177 A | 10/1969 | Garrett et al. |
| 3,489,438 A | 1/1970 | McClure |
| 3,547,161 A | 12/1970 | Reece et al. |
| 3,581,776 A | 6/1971 | Sheahan ..................... 138/108 |
| 3,626,987 A | 12/1971 | Bittner ....................... 138/114 |
| 3,907,336 A | 9/1975 | Siegmund .................... 285/93 |
| 3,933,182 A | 1/1976 | Costes ........................ 138/149 |
| 3,991,834 A | 11/1976 | Curington |
| 4,220,179 A | 9/1980 | Scheffler et al. ............ 138/113 |
| 4,274,549 A | 6/1981 | Germain .................... 220/86 R |
| 4,321,110 A | 3/1982 | Nickel et al. ............... 376/250 |
| 4,332,170 A | 6/1982 | Belval et al. ............. 73/40.5 R |

(List continued on next page.)

FOREIGN PATENT DOCUMENTS

| EP | 0337674 | 10/1989 |
| GB | 2262321 | 6/1993 |
| WO | 9012241 | 10/1990 |

*Primary Examiner*—James Hook
(74) *Attorney, Agent, or Firm*—Ostrolenk, Faber, Gerb & Soffen, LLP

(57) ABSTRACT

A lined tubular system and method provides for the manipulation and control of annular fluids in channels (18) between the tubular (10) and the liner (17). This structure allows for profiling of the exterior wall of a liner such that one or more continuous channels are provided along the length of the lined tubular system. The system may also include one or more non-crushable members or tubes between the liner's exterior surface and host tubular's interior surface. Rounded, granular particles or spacers in the annulus between the liner and host may provide an alternative path for fluid flow. The particles or spacers may be uniformly or randomly distributed in the annulus.

18 Claims, 17 Drawing Sheets

U.S. PATENT DOCUMENTS

| | | | | |
|---|---|---|---|---|
| 4,386,269 A | 5/1983 | Murphy | ................ | 250/227 |
| 4,450,711 A | 5/1984 | Claude | ................ | 73/40.5 R |
| 4,529,009 A | 7/1985 | Horner et al. | ................ | 138/111 |
| 4,554,650 A | 11/1985 | Brown et al. | ................ | 367/154 |
| 4,644,780 A | 2/1987 | Jeter | ................ | 73/40.5 R |
| 4,651,893 A | 3/1987 | Mooney | ................ | 220/445 |
| 4,667,505 A | 5/1987 | Sharp | ................ | 73/40.5 R |
| 4,676,563 A | 6/1987 | Curlett et al. | ................ | 439/194 |
| 4,683,944 A | 8/1987 | Curlett | ................ | 166/65.1 |
| 4,693,279 A | 9/1987 | Aubert | ................ | 138/108 |
| 4,700,751 A | 10/1987 | Fedrick | ................ | 138/149 |
| 4,756,339 A | 7/1988 | Buluschek | ................ | 138/115 |
| 4,804,020 A | 2/1989 | Bartholomew | ................ | 138/111 |
| 4,805,444 A | 2/1989 | Webb | ................ | 73/40.5 R |
| 4,836,305 A | 6/1989 | Curlett | ................ | 175/215 |
| 4,920,786 A | 5/1990 | Danielson | ................ | 73/49.2 |
| 4,924,949 A | 5/1990 | Curlett | ................ | 175/25 |
| 4,932,257 A | 6/1990 | Webb | ................ | 73/40.5 R |
| 4,965,036 A | 10/1990 | Miyazaki et al. | ................ | 264/269 |
| 5,040,408 A | 8/1991 | Webb | ................ | 73/40.5 R |
| 5,060,509 A | 10/1991 | Webb | ................ | 73/40.5 R |
| 5,072,622 A * | 12/1991 | Roach et al. | ................ | 73/40.5 R |
| 5,127,441 A | 7/1992 | Rains | | |
| 5,129,428 A | 7/1992 | Winter et al. | | |
| 5,172,730 A | 12/1992 | Driver | | |
| 5,222,769 A | 6/1993 | Kaempen | ................ | 285/45 |
| 5,305,798 A | 4/1994 | Driver | ................ | 138/98 |
| 5,327,945 A | 7/1994 | Simpson et al. | ................ | 141/59 |
| 5,327,949 A | 7/1994 | Dotson et al. | ................ | 141/206 |
| 5,333,490 A | 8/1994 | Webb | ................ | 73/40.5 R |
| 5,335,872 A | 8/1994 | Clubbs | ................ | 242/610.6 |
| 5,343,738 A | 9/1994 | Skaggs | ................ | 73/40.5 R |
| 5,395,472 A | 3/1995 | Mandich | | |
| 5,409,561 A | 4/1995 | Wood | ................ | 156/287 |
| 5,454,419 A | 10/1995 | Vloedman | ................ | 166/277 |
| 5,469,891 A | 11/1995 | Lund et al. | ................ | 138/98 |
| 5,490,419 A | 2/1996 | Webb | ................ | 73/40.5 R |
| 5,497,809 A | 3/1996 | Wolf | ................ | 138/113 |
| 5,546,992 A | 8/1996 | Chick et al. | ................ | 138/98 |
| 5,551,484 A | 9/1996 | Charboneau | ................ | 138/104 |
| 5,611,373 A | 3/1997 | Ashcraft | ................ | 138/113 |
| 5,743,299 A | 4/1998 | Chick et al. | ................ | 138/98 |
| 5,778,938 A | 7/1998 | Chick et al. | ................ | 138/98 |
| 5,831,149 A | 11/1998 | Webb | ................ | 73/40.5 R |
| 5,865,216 A | 2/1999 | Youngs | | |
| 6,220,079 B1 * | 4/2001 | Taylor et al. | ................ | 73/37 |

* cited by examiner

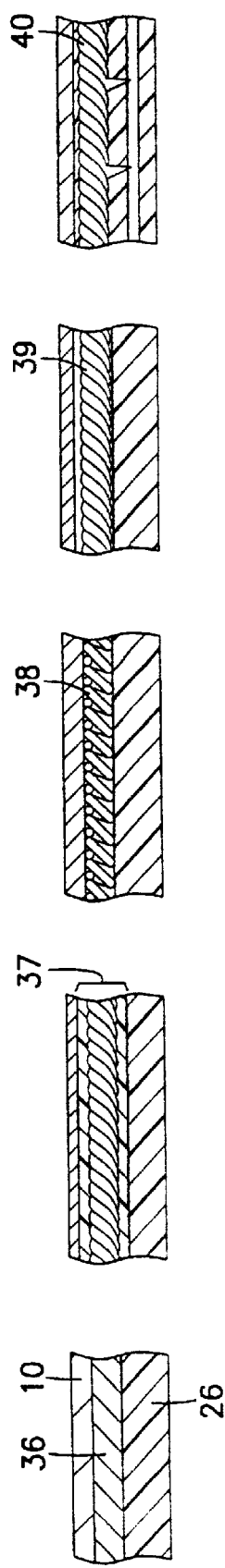

ANNULAR FLUID MANIPULATION IN LINED TUBULAR SYSTEMS

CROSS-REFERENCE TO RELATED APPLICATIONS

This is a continuation-in-part of the same inventors' Ser. No. 09/353,300 filed Jul. 13, 1999, allowed now U.S. Pat. No. 6,220,079.

This application is based on and claims priority from U.S. provisional patent application 60/093,665 filed Jul. 22, 1998, in the name of Jack C. Taylor.

This application is related to Ser. No. 08/532,561 filed Jun. 4, 1990, now U.S. Pat. No. 5,072,622; and the following provisional applications, all filed in the name of Jack C. Taylor: Ser. No. 60/094,326 filed Jul. 28, 1998; Ser. No. 60/094,585 filed Jul. 29, 1998; and Ser. No. 60/138,814 filed Jun. 14, 1999.

Some, but not all of the aspects of the invention described herein have been filed under the USPTO Document Disclosure program by the inventor, under reference numbers 413480 (Jul. 21, 1997), 413924 (Jul. 21, 1997), 415633 (Mar. 10, 1997) and 430792(Jan. 26, 1998).

The foregoing disclosures are incorporated by reference herein.

BACKGROUND OF THE INVENTION

Pipes and other tubulars have been lined with polymeric liners (e.g. polyethylene, nylon 11, etc.) for many years and several installation techniques are known to the art. These systems have been used principally in offshore and onshore pipelines, and in downhole production tubulars. Their scope has generally been limited to corrosion and erosion protection. However, they have also been used in monitoring for integrity of the composite liner-host system, as disclosed in U.S. Pat. No. 5,072,622 (Roach & Whitehead)

Generally, the liner resides in close-tolerance with the host pipe along its length, forming a stable composite system, as shown in FIG. 1 which is a cutaway end view of a tubular 10 lined with a liner 11. The installed liner may be either of a loose-fit or a compressed-fit variety, both well known to the art. In all but low pressure applications, the stresses induced by fluid pressure from within the liner are transmitted to the surrounding "host" tubular, and resisted by same. The liner acts as an intermediary layer.

SUMMARY OF THE INVENTION

The invention described herein expands the range of possible applications of liners by providing for manipulation and control of annular fluids within the lined tubular systems.

The disclosed embodiments of the invention provide, among other features, a continuous annulus along the length of plastic-lined tubular, and if applicable, through any intermediary joints.

Other features and advantages of the present invention will become apparent from the following description of embodiments of the invention which refers to the accompanying drawings.

BRIEF DESCRIPTION OF THE DRAWINGS

FIGS. 9a–9e are multiple cutaway side views of non-crushable members disposed between a liner and a host tubular.

DETAILED DESCRIPTION OF EMBODIMENTS OF THE INVENTION

Formation of the Annulus

Three general liner types according to embodiments of the invention will be explained first.

Figure 2A:
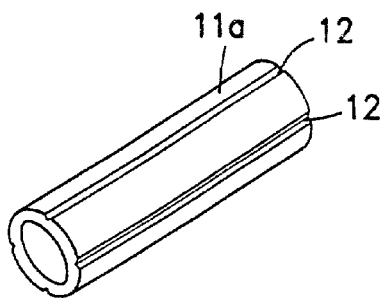
FIGS. 2a, 2b and 2c are respectively isometric illustrations of profiled liners.
Figure 2B:
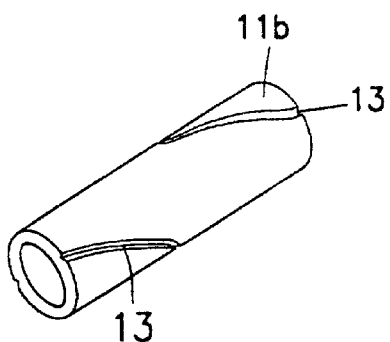
Figure 2C:
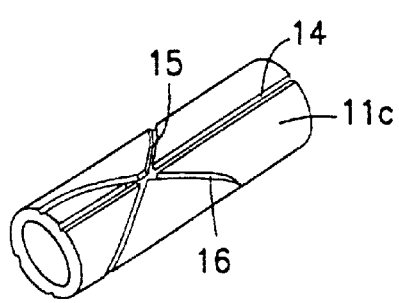
Figure 3C:
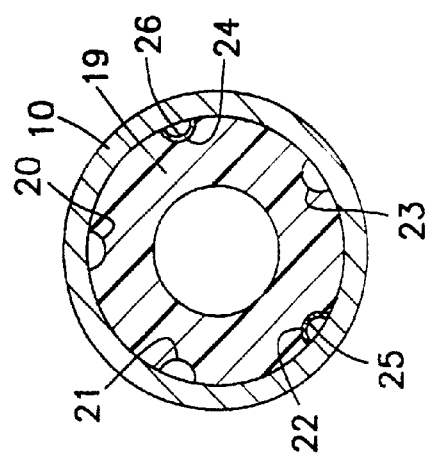
FIGS. 3a, 3b and 3c are respectively a side view and two cutaway end views of profiled liners in tubulars.
Figure 3B:
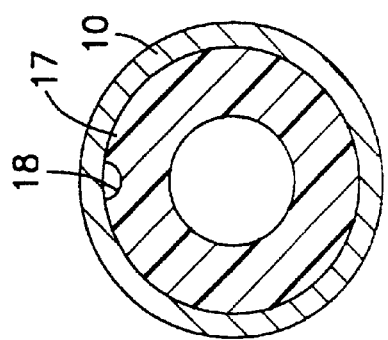
Figure 3A:
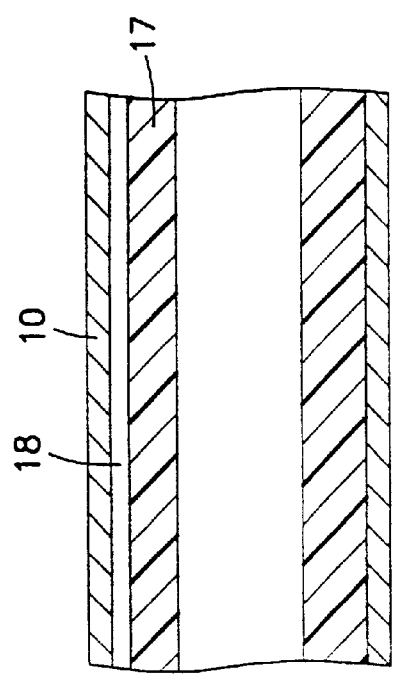

The first type of liner provides for profiling of the exterior wall of the liner such that one or more channels, shown in cross-section, are continued along the length of the lined tubular system (as shown in FIGS. 2a, 2b and 2c, which are respectively isometric illustrations of profiled liners, and in FIGS. 3a, 3b and 3c, which are respectively a side view and two end cutaway views of profiled liners in tubulars).

FIG. 2a shows a liner 11a with four straight longitudinal channels 12. FIG. 2b shows a liner 11b with two helical channels 13. FIG. 2c shows a liner 11c with one straight channel 14 and two helical channels 15 and 16.

FIG. 3a is a longitudinal cross-section and FIG. 3b is a transverse cross-section of a tubular 10 and a liner 17 with a single longitudinal channel 18. FIG. 3c shows a tubular 10 and a liner 19 with five channels 20–24.

In this first type of embodiment, one or more of the channels in the liner can be reinforced (the profiles 22 and 24 have reinforcements 25 and 26, respectively), or they may be left unsupported (see FIG. 3c). The reinforcement 25 is a portion of the liner 19 which is treated or modified to increase its strength and thereby reinforce the profile 22. Our possible modification is a reinforcing polymer coextruded along the portion of the liner. One possible treatment is fast-quenching the portion of the liner to increase its crystallinity. Other strengthening treatments and modifications are also within the scope of the invention. On the other hand, the reinforcement 26 may be metallic or another strong material such as a ceramic or a polymer. Any strengthening material can be used.

Figure 6:
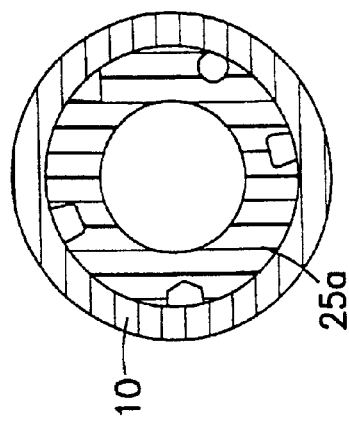
FIG. 6 is a cutaway end view of a lined tubular with multiple differently-shaped profiles formed in a liner.

The geometry of the defined channel may be varied according to individual preference and manufacturing capability. A plurality of different profile shapes may be used (as shown in FIG. 6, which is an end cutaway view of a lined tubular 10 with differently-shaped multiple profiles in a liner 25a). The profiling of the grooves may be varied freely without departing from the scope of the invention.

In the second type of liner, one or more non-crushable members are introduced between the liner's exterior and the host tubular's interior, such members providing continuity. See FIGS. 4a, 4b and 4c, which are respectively a side view and two end cutaway views of lined tubulars with members disposed therein.

In this second type of embodiment, one or more non-crushable members are located in the system annulus. The liner may either be profiled as described in the first embodiment, or it can be essentially smooth surfaced. The non-crushable members may be situated in the host tubular prior to the insertion of the liner, or they may be inserted concurrent with the liner. They may be affixed to the host tubular and/or the liner, but need not be adhered to either.

The members may comprise metal or any other durable material. Continuity along the channels within the host tubular may be provided by interstitial areas adjacent to the non-crushable members (which are disposed either within the channels, or between the host tubular and the outer surface of the liner, as the case may be).

Alternatively, continuity may be provided by making the non-crushable member of an effectively porous material, or by providing a non-crushable member which has lateral and longitudinal openings or perforations (such as a hollow member, a spring, or a cable with interstitial areas between the cable fiber strands) so as to permit fluid flow both into and along the non-crushable members. The member should be more permeable than the liner. Under operating conditions the member should not effect a seal which would prevent fluid permeating through the liner from reaching the annular pathway, or channel. Such a seal may occur, for example, when a solid semi-circular reinforcing member seated in a liner channel (see the '622 patent) is displaced radially outward into intimate contact with the host pipe as the liner bore pressure is increased. The edges of the member may intimately contact the host pipe, thus preventing permeating fluids from reaching the channel. In view of such considerations, therefore, a desirable alternative is to use a functionally porous reinforcing member. In the above examples, the porous member may be a multi-strand cable or helical spring. Equally effectively, the desired porosity can be gained by using a member with an inherently porous material structure.

Figure 4C:
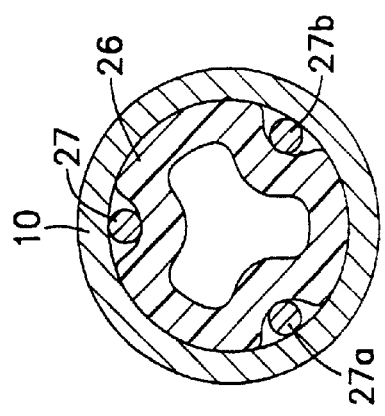
FIGS. 4a, 4b and 4c are respectively a side view and two cutaway end views of lined tubulars with non-crushable members disposed therein.
Figure 4B:
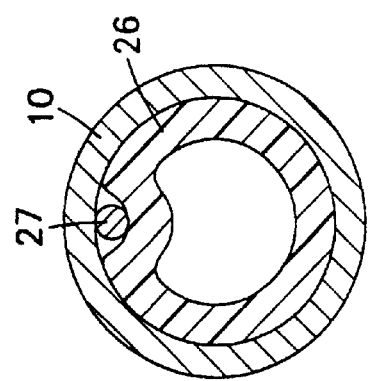
Figure 4A:
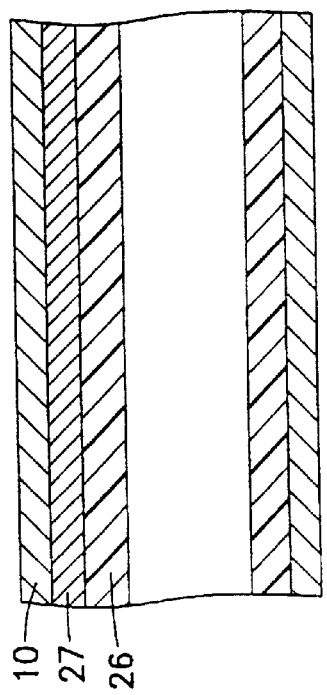

FIG. 4a is a longitudinal cross-section and FIG. 4b is a transverse cross-section of a tubular 10, a non-profiled liner 26, and a non-crushable member 27, shown as a cable in this example, disposed between the liner 26 and the tubular 10. As shown in FIG. 4c, two additional cables 27a and 27b are disposed between the liner 26 and the tubular 10.

Figure 8:
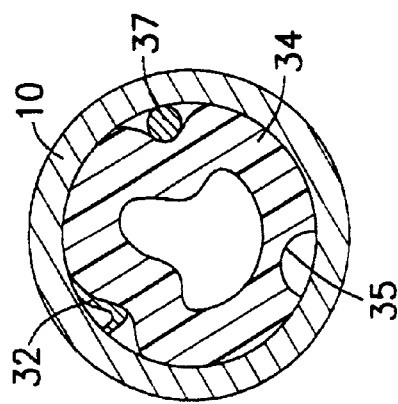
FIG. 8 is a cutaway end view of a lined tubular with non-crushable members disposed therein.
Figure 7:
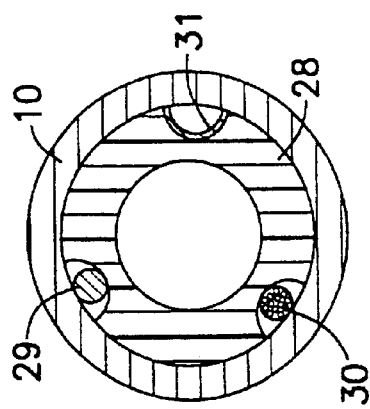
FIG. 7 is a cutaway end view of a lined tubular with non-crushable members disposed within profiles.

In the case of a profiled liner, a non-crushable member may be situated in one or more of the channels or depressions (see FIG. 7, which is an end cutaway view of a lined tubular 10, 28 with non-crushable members 29, 30, 31 disposed within profiles), or at the radial extremities (see FIG. 8). In FIG. 7, the member 29 is a bar, the member 30 is a cable, and the member 31 is a part-cylindrical reinforcement. In FIG. 8, a liner 34 has one channel 35 and two non-crushable members 32, 33 disposed not in the channel 35, but rather between the circumference of the liner 34 and the inner surface of the tubular 10. Non-crushable members may also take a mixed path across both regions. See FIG. 2c, which is an isometric view of a liner with mixed paths for profiles and/or non-crushable members. A non-crushable member if desired can be partially retained within a profile and can partially pass out of the profile into the space between the host tubular and the radial extremity of the liner. Or, a non-crushable member can change course and pass from one channel into another intersecting or non-intersecting channel.

The geometry of the non-crushable members may be varied according to individual preference. However, as a practical matter, the members' geometry should not induce a stress riser which is harmful to the liner or the host under expected operating conditions. Accordingly, it may be preferred that the contacting area of the member have a rounded shape.

In one such embodiment, a cable may serve as the non-crushable member, and in another, a helical spring. See FIG. 8, which is an end cutaway view of a lined tubular 10, 34 with non-crushable members 32, 33 disposed therein. FIGS. 9a–9e show multiple side cutaway views of non-crushable members between liner 26 and host tubular 10. In FIG. 9a, the member is a solid bar 36; in FIG. 9b a coated cable 37; in FIG. 9c a helical spring 38; in FIG. 9d an uncoated cable 39; and in FIG. 9e a barbed cable 40. The member, when situated in the composite liner-host system, will create at least one channel, dependent upon geometry, when the liner is installed.

The third type of liner involves the incorporation of rounded, granular particles, or irregularities on the outer surface of the liner, hereinafter referred to generally as "spacer members," in the annulus between liner and host. The spacer members are arranged in an orderly or a random fashion, as shown in FIGS. 5a, 5b and 5c, which are respectively a side view and two cutaway views of lined tubulars with spacer members disposed therein.

Figure 5C:
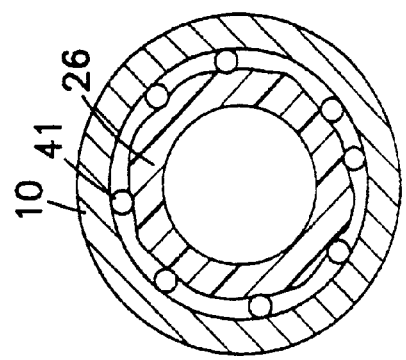
FIGS. 5a, 5b and 5c are respectively a side view and two cutaway end views of lined tubulars with spacer members disposed therein.
Figure 5B:
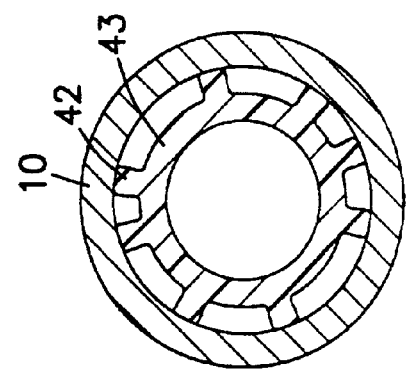
Figure 5A:
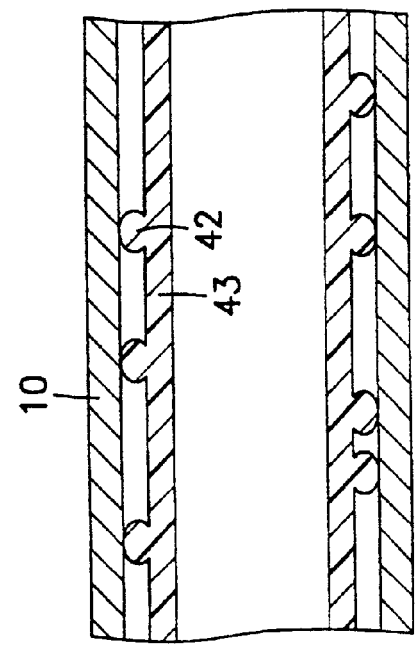

In this third type of embodiment, relatively small, rounded, non-crushable particles can be located within the annulus to create a pebbling effect (see FIG. 5c). Correctly positioned, these particles maintain annular continuity, thus permitting the flow of fluids therein. As in the previous case, the particles should not induce a harmful stress riser.

Effective embodiments may be provided by other methods as well. Irregularities 42 on the outer surface 43 of the plastic liner (see FIGS. 5a and 5b) may be fabricated in the liner's production process via controlled extrusion or adhesion. In another method, the irregularities may be introduced onto the plastic liner outer surface post-production, via adhesion or fusion. Alternatively, they may be integrated with the inside surface of the host tubular (not shown).

The spacer members need not be integral with either the plastic liner or the host tubular to achieve the desired effect, however. Particles 41 may be located within the annulus (see FIG. 5c). For example, the particles may be introduced into the host tubular at the time of insertion of the plastic liner, with the dragging motion of the liner during the insertion process distributing them to their individual resting places. Alternatively, they may be pumped or blown in prior to and/or during the insertion process.

When situated, the spacer members create inconsistencies at the liner-tubular interface, effectively creating one or more pathways as in the previous two types of embodiments described; irregular in nature, but continuous nonetheless.

Reducing the Amount of Annular Fluid

Figure 10:
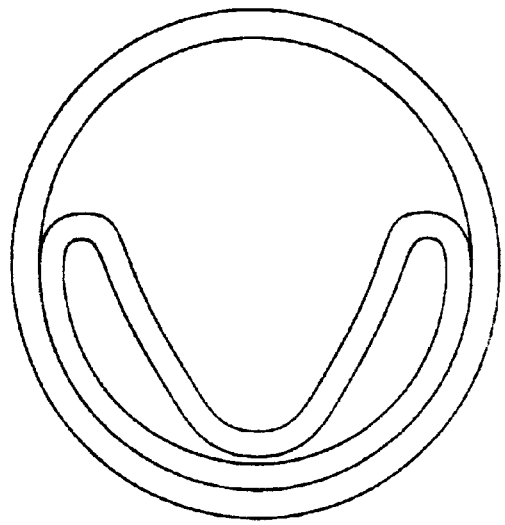
FIG. 10 is a cutaway end view of a conventional radially buckled liner within a host tubular.

A major utility of the invention is avoiding system failure due to liner collapse. This collapse is most often triggered by the buildup of annular fluids which have permeated or diffused through the liner from within the system. Such fluids may exist in either gas or liquid phase dependent upon conditions in the annulus. For the most part an equilibrium is in effect; the internal fluid pressure counters the annular pressure. However, in the course of normal operations, internal pressure may be reduced to substantially less than the annular fluid pressure, for example in a shutdown. The resulting pressure differential may allow an expansion of the annular fluid to occur as the pressures attempt to equalize. This is particularly true if the liner is unable to withstand the external stress on its own, and radial buckling results (see FIG. 10, which is an end cutaway view of a radially buckled conventional liner within a host tubular). This collapse within the host tubular nullifies the composite system's function.

Figure 1:
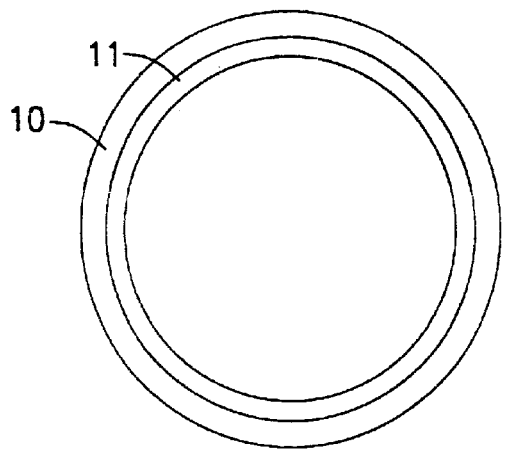
FIG. 1 is a cross-sectional view of a conventional lined tubular.

In liner systems known to the art, mechanisms to vent annular fluids have been inadequate to prevent liner collapse on a robust basis. Typically, the liner outer surface maintains a significant degree of contact with the inner host wall (see FIG. 1). This geometry makes for a significant degree of sealing. The annular cross sectional area is thus reduced, to the extent that only an extremely tortuous, i.e. non-functional, path exists for the annular fluid's migration toward any venting mechanism along the system. Generally, current liner systems' inherent annular pressure relief capability is inversely proportional to the distance between vents, and to the degree of sealing; the latter being variable as a function of liner, host materials, their surface properties, fluid constituents, and operating variables such as pressure and temperature.

The onset of the liner collapse phenomenon is dependent upon inter-related variables, which include differential pressure. A partial list of other contributors is the liner's apparent mechanical properties under a given set of operating conditions, nature of fluid transported, pressure, temperature, and effective rate of fluid permeability.

Adequate removal of annular fluids minimizes the possibility that differential pressure will be a significant contributor to liner collapse. The only significant remaining stress/strain criteria are factors such as absorption swell and temperature, which have been generally found to be insufficient to cause radial buckling collapse.

Figure 11:
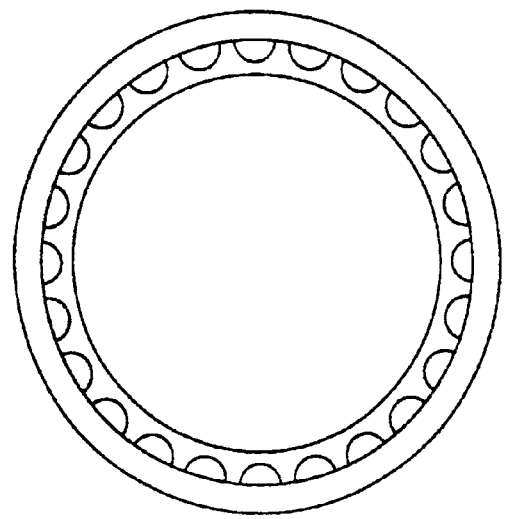
FIG. 11 is an end cutaway view of a profiled liner within a host tubular.

The continuous annulus provided for in this invention provides the ready evacuation of annular fluids, thus minimizing the potential for liner collapse (see for example FIG. 11 which is an end cutaway view of a profiled liner within a host tubular).

Reduction of the amount of fluid in the annulus may be accomplished by active or passive means.

Figure 12A:
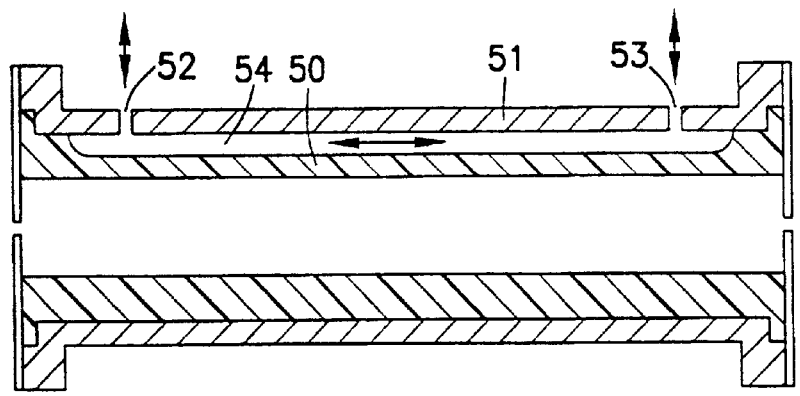
FIG. 12a is a cutaway side view showing a profiled liner within a host tubular.

In a simple embodiment of the invention, the liner provides free venting of annular fluid to the environment. See FIG. 12a, which is a side cutaway schematic showing a profiled liner 50 within a host tubular 51). A pair of vents 52, 53 communicate directly with the annulus 54.

Figure 12B:
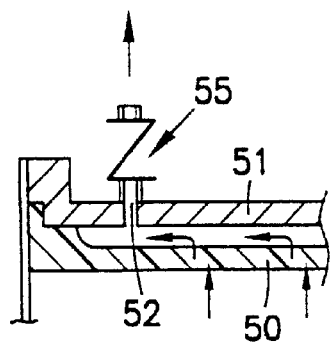
FIGS. 12b and 12c are cutaway side views showing the system of FIG. 12a with the addition of a check valve and a pump, respectively.

A one-way check valve 55 may be employed to control annular pressure within a range greater than that in the environment and less than that within the bore of the liner (see FIG. 12b), said valve permitting continuously permeating annular gases to vent and thereby avoiding annular collapse.

Figure 12C:
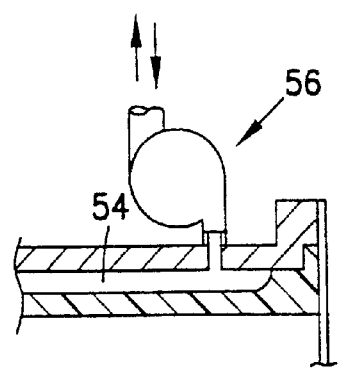

In another embodiment, a pump 56, either vacuum or positive pressure, may be connected to the annulus 54 to control the fluid pressure therein to a greater degree (see FIG. 12c). With the addition of a sensing system, this embodiment may be used in the system disclosed in U.S. Pat. No. 5,072,622 mentioned previously.

Fluids in the annulus may be of gas, liquid, or mixed phase, depending upon the inter-relationship between materials, fluid conveyed, and operating conditions.

Pressure Balance Between Annulus and Bore

Figure 13A:
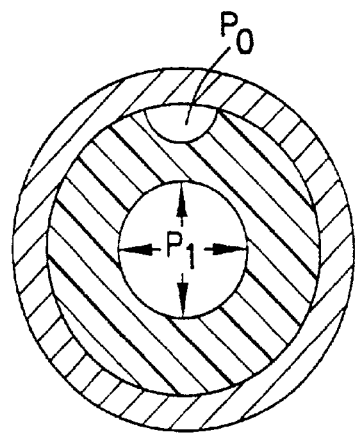
FIGS. 13a–13c are end cutaway views illustrating liner behavior under various operating pressure modes.
Figure 13B:
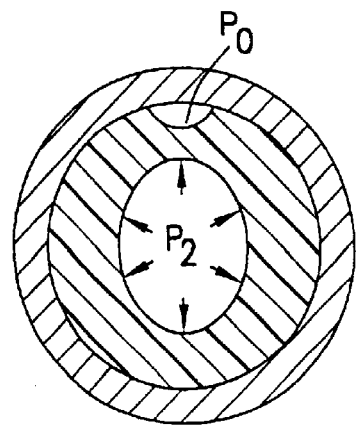

When composite liner-host systems are operated at relatively high pressures, the pathways, as described in the above embodiments, may be reduced in cross-sectional area. See FIGS. 13a–13c, which are a series of end cutaway views illustrating liner behavior under various operating pressure modes. Normal operating conditions are shown in FIG. 13a, in which the pressure $P_1$ in the bore and the pressure $P_0$ in the annulus are in balance. However, with a higher pressure $P_2$ in the bore, the liner strains and the annulus diminishes, when $P_2 >> P_1$. See FIG. 13b. This lowers the effectiveness of the system.

Figure 13C:
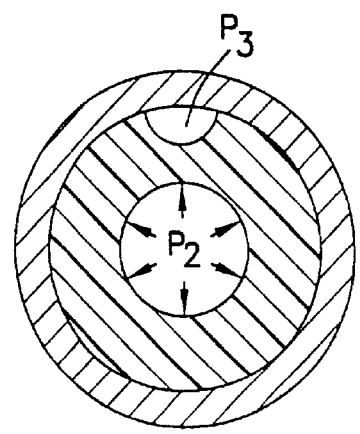

Annular fluid pressure may be increased to $P_3$ to offset this reduction, provided the pressure differential between the annulus and the interior of the system is not raised to a level sufficient to initiate collapse (see FIG. 13c, where $P_2$ is approximately equal to $P_3$)

It may, however, be desirable to utilize a non-compressible fluid in the annulus. Such a fluid, by its very nature, will inhibit the reduction of the cross-sectional area of the annular pathway(s). Also, upon system depressurization, it will not induce liner collapse as it will not expand sufficiently to contribute to buckling.

In this case, annular and internal pressures are effectively equalized at all times. The permeation potential is mitigated as the differential pressure is minimized. Correspondingly, the amount of fluid permeating the liner is minimized. With such fluids potentially being of compressible nature, they are able to contribute to their liner collapse when present upon system depressurization.

Further, it may be desirable to utilize a certain type of non-compressible annular fluid, specifically, a liquid relatively insoluble with respect to the fluid-in-transit's ingredients that most readily permeate through the liner. Accordingly, very little permeant, particularly of a gas phase, will be able to dissolve into such annular liquid. Then, upon annular depressurization, little evaporation will occur. The phase change from liquid to gas is particularly undesirable as it corresponds to a relatively large increase in annular fluid volume, contributing significantly to liner collapse.

Such fluids should not be detrimental to the liner or host pipe. However, they should be stable at typical operating temperature/pressure conditions. Examples include hydraulic oil, brake fluid, and similar fluids.

It is desirable to minimize the strain that the liner experiences so that the strain is not enough to induce radial buckling. The strain required to induce this buckling is positively correlated to the increase in annular volume relative to that volume while the system is in normal operation, due greatly to the expansion of gas-phase fluids in the annulus. Further, the degree of volume increase can be correlated to several operating system variables; directly with respect to the initial annular volume subject to pressure-related expansion, directly with respect to the annular pressure differential, and inversely with respect to the structural capability of the liner to resist radial buckling.

By employing a non-compressible fluid in the annulus, the risk of liner collapse is mitigated. Such a fluid occupies space which could otherwise be taken up by annular fluids subject to expansion upon pipe bore depressurization, i.e., gaseous phase fluids which permeate through the liner, such as methane and carbon dioxide in the case of hydrocarbon flowlines. Effectively, therefore, the non-compressible fluid reduces the initial annular volume, with positive benefit.

Further, a non-compressible fluid filling the annulus also reduces the pressure differential between the annulus and the bore at normal operating conditions to positive effect. By virtue of its nature, it provides for pressure equalization on both sides of the liner membrane without allowing significant deformation of the liner channels. Generally, permeation rate of fluids through a member increases with increasing pressure differential. Therefore, a reduction of the effective pressure differential will reduce the rate of permeation of undesireable potentially gaseous phase fluids.

It is further beneficial to use a non-compressible annular fluid in which undesireable gaseous phase permeating fluids are relatively insoluble. Partial pressure equilibrium of said undesireable gaseous fluids on each side of the liner membrane will be sought, in accord with their individual solubility coefficients and the laws of partial pressure. As the amount which will enter solution is minimized by use of an appropriate solubility-incompatible annular fluid, so will the total amount. Accordingly, less solution gas is available to evaporate upon reduction of system pressure in the course of operations. Correspondingly there will be minimal increase in annular volume, and thus potential for liner radial buckling is reduced.

Finally, circulation and changeover of the non-compressible annular fluid is beneficial. The amount of undesireable potentially gaseous phase fluids permeating through the liner into the annulus increases with time. Similarly, so do their respective concentrations in solution with the non-compressible fluid, ultimately attaining saturation in accord with the partial pressure laws. Accordingly, replacing the partially- or fully-saturated, nominally non-compressible, annular fluid with fluid containing a lower concentration of the undesireable compressible fluids will minimize the potential for increase of liner annular volume upon depressurization, and hence the risk of liner collapse.

Individually, or in any combination, these non-compressible fluid manipulation factors minimize the volume of undesireable potentially gaseous phase fluids in the annulus. Accordingly, as one of the contributory operational variables mentioned above, in conjunction with pressure differential and structural resistance criteria, the use of non-compressible fluid contributes to reduction of the potential for liner radial buckling. The amount of compressible fluid present in the annulus which will induce a liner buckling failure is individual case-specific, and broad generalizations in terms of relative amounts are inappropriate. As all three variables work in concert, virtually any reduction in the relative amount of compressible fluid present in the annulus can be significant.

Circulation of Fluids in the Annulus

Figure 14:
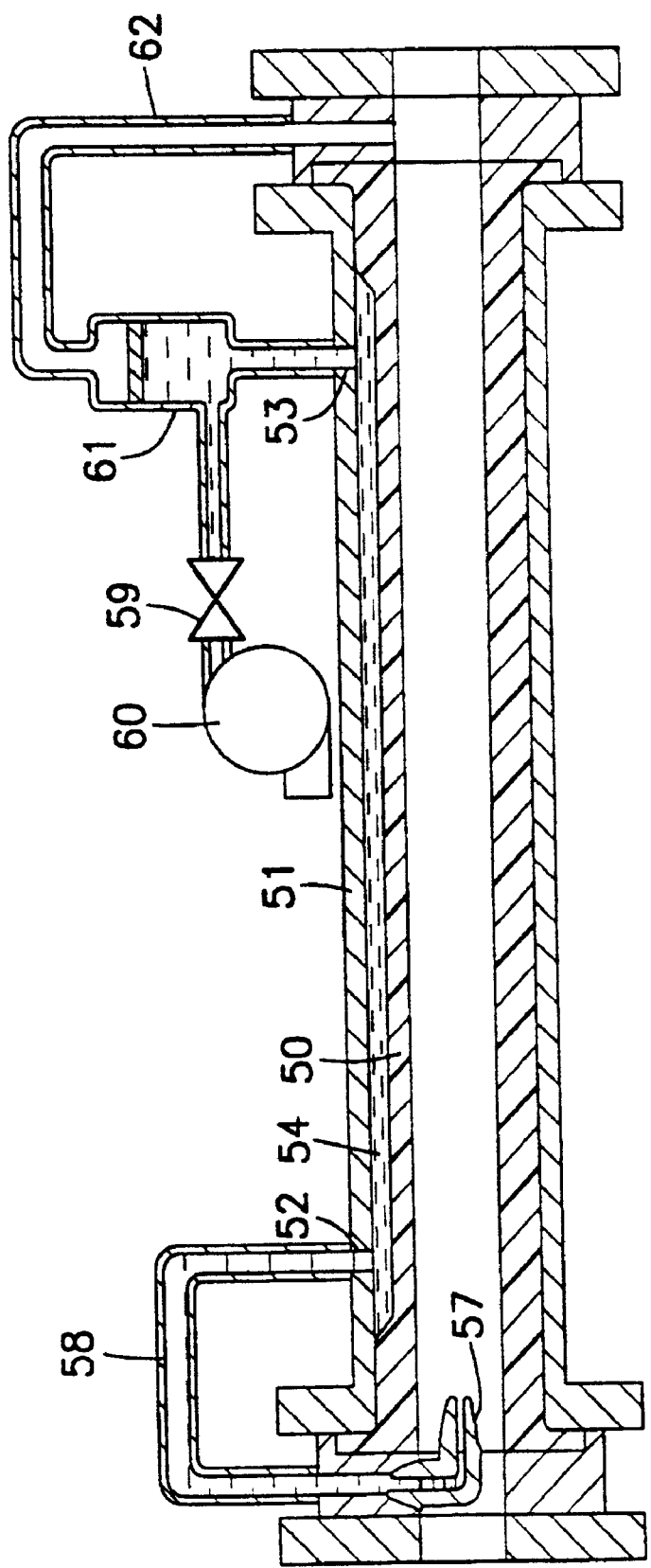
FIG. 14 is a side cutaway view of a lined tubular with annular fluid circulation.

The continuous annulus of the invention may also be used to circulate the annular fluids, for several benefits. First, as related to the use of non-compressible fluids as described immediately above, circulation can provide for replacement of the annular fluid. See FIG. 14, a side cutaway view of a lined tubular with annular fluid and other features to be described below. On a controlled basis, annular fluid contaminated by permeated fluids, e.g., liquid with gases in solution, may be exchanged for new. The net effect is less expandable fluid in the annulus and as a result, a reduction in the collapse potential.

Also, circulation of annular fluid can confirm the functionality of the annular pathway(s), and hence monitor the integrity of the system. In simple terms, if the annular fluid fails to circulate, it is unable to provide the benefits intended.

Figure 15A:
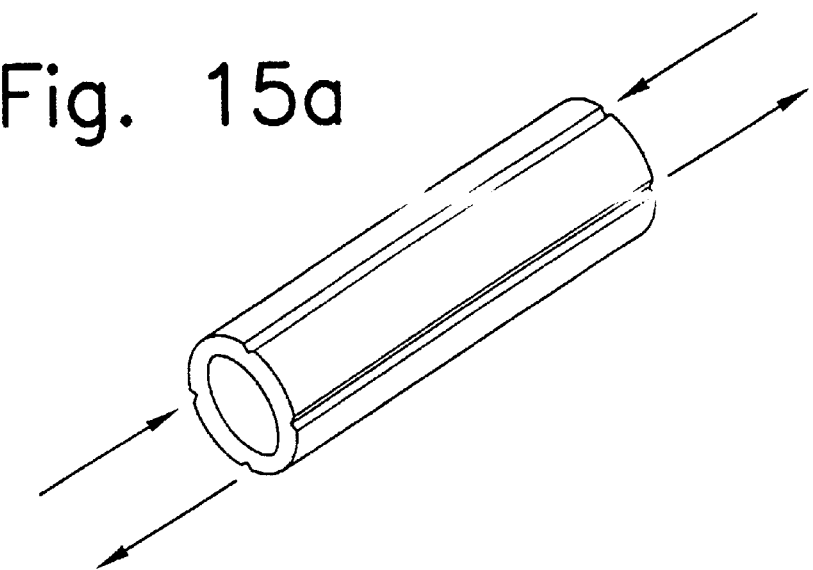
FIGS. 15a and 15b are isometric views illustrating bidirectional flow in the liners of FIGS. 2a and 2b, respectively.
Figure 15B:
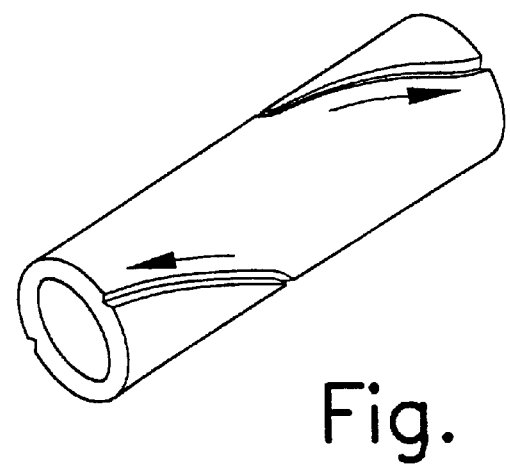

In one embodiment, fluid may be injected at one end of a lined tubular system, along one or more annular fluid paths. The geometric configuration (such as a connecting groove) at the opposite end may provide for the return of the same fluid back to the injection end from a different, isolated fluid path or paths. See FIGS. 15a and 15b, which are isometric views of liners, without the surrounding hosts, illustrating bidirectional flow in the same liners shown in FIGS. 2a and 2b. Accordingly, if such fluid flow is measurable upon return, the operator can be assured that the continuity of the annulus is maintained, and thus, the expanded functionality of the liner is preserved.

Such an annular circuit may also act as a monitoring system for the integrity of the composite system. In the event of a breach in the liner and/or the host pipe, annular fluid circulation may be diminished or lost, or, the returned fluid may contain telltale constituents. Each of these cases indicates a loss of system integrity. If the host's wall integrity is suspect, detection fluids, e.g. mercaptans or dyes, may be injected into the annular fluid stream, facilitating problem location by remote reconnaissance.

The fluid dynamics of the invention are differentiated from U.S. Pat. No. 5,072,622, described earlier. In the '622 patent there is a static pressure differential in the entire annulus which does not change until an out-of-range condition indicates that a problem has occurred. In the present case, on the other hand, there is injection and circulation of fluid and constant monitoring of actual pressure levels to give a continuing report on the operation of the system.

As another benefit of the continuous annulus, specific fluids may be introduced at one end and then directed into the primary, internal fluid stream at the remote end. In the embodiment shown in FIG. 14, a port at the remote location, e.g., a venturi orifice 57 in fluid communication with the vent 52 via a pipe 58, allows introduction of the fluid. Such fluids may include methanol (for hydrate prevention), solvents (for scale prevention) and other known fluids. In practice, particularly in an offshore energy production flowline, this facility may eliminate the need for construction of a costly accompanying service line.

It may be desirable to limit the pressure or the annular fluid to the lowest value of the fluid-in-transit, typically the exit pressure, in order to minimize the chance of liner collapse in the event of a line depressurization. This may be accomplished by the use of one or more of a control valve 59, a pump 60 and/or a hydraulic accumulator system 61, installed at the exit. These devices are in fluid communication with both the annulus 54 at the vent 53, and the system's interior via a pipe 62. Alternatively, or in combination, other electrical and/or mechanical sensing or control devices may be employed to this end.

Figure 22:
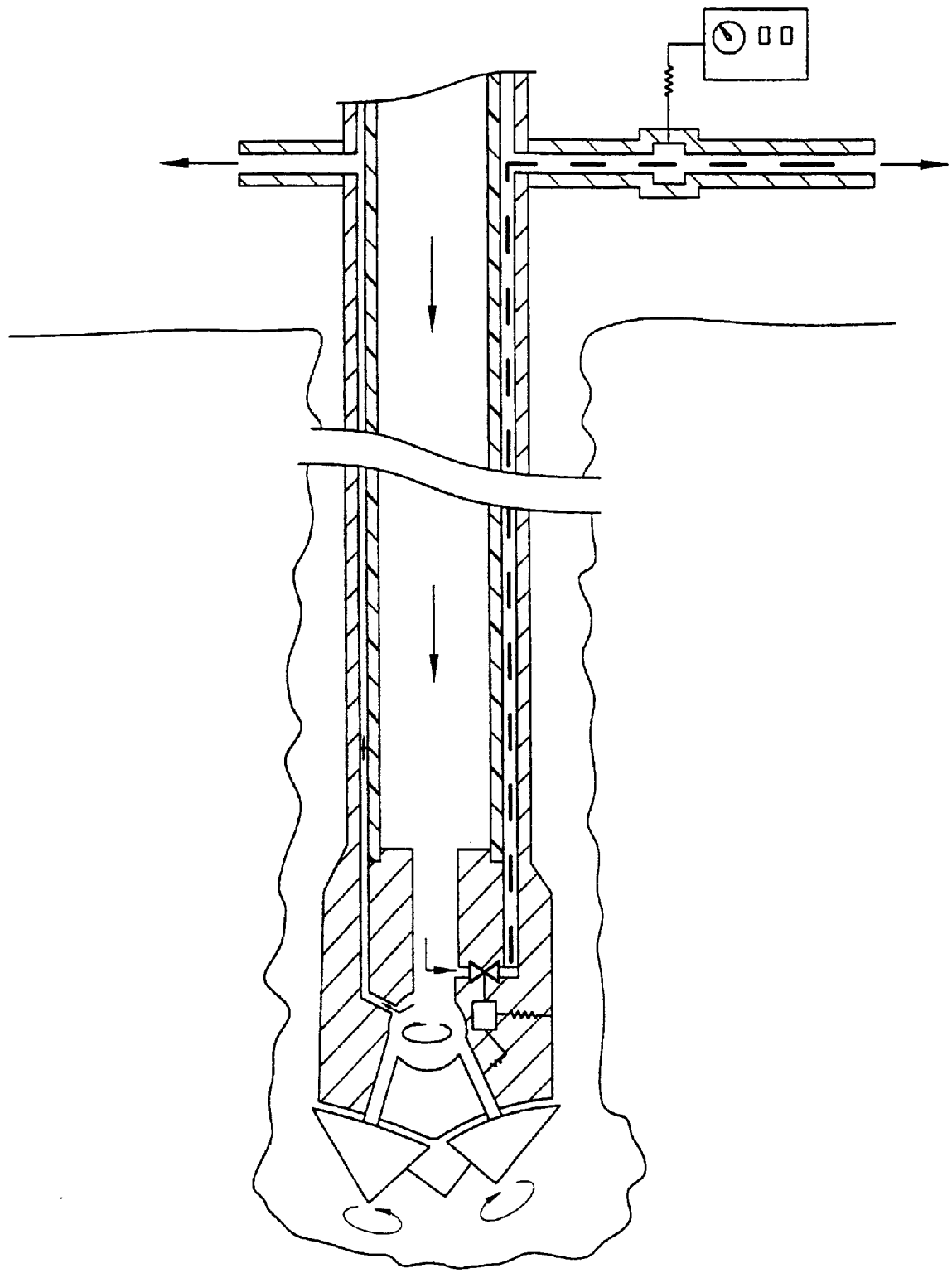
FIG. 22 is a schematic diagram of a drilling rig with a measuring-while-drilling apparatus.

The control of fluid through a continuous annulus facilitates remote communication capability. See FIG. 22, which is a schematic diagram of a drilling rig with a measuring-while-drilling apparatus, from which acoustic and/or pressure waves may be transmitted as a signal through the annular fluid from the remote end of the lined tubular system to the surface. The insulating and/or dampening effect of the liner wall mitigates signal interference from the main flowstream within. The results are improved data transmission and acquisition rates, and accuracy of interpretation, particularly using certain liquid annular fluids. Such a system has utility for various ends, e.g., to operate remote well controls.

The annulus can be used as a return path for fluids which have been transported to a remote location within the composite system. Porting between the two paths, either at the downstream end or at intermediate locations, will accomplish this.

Figure 16:
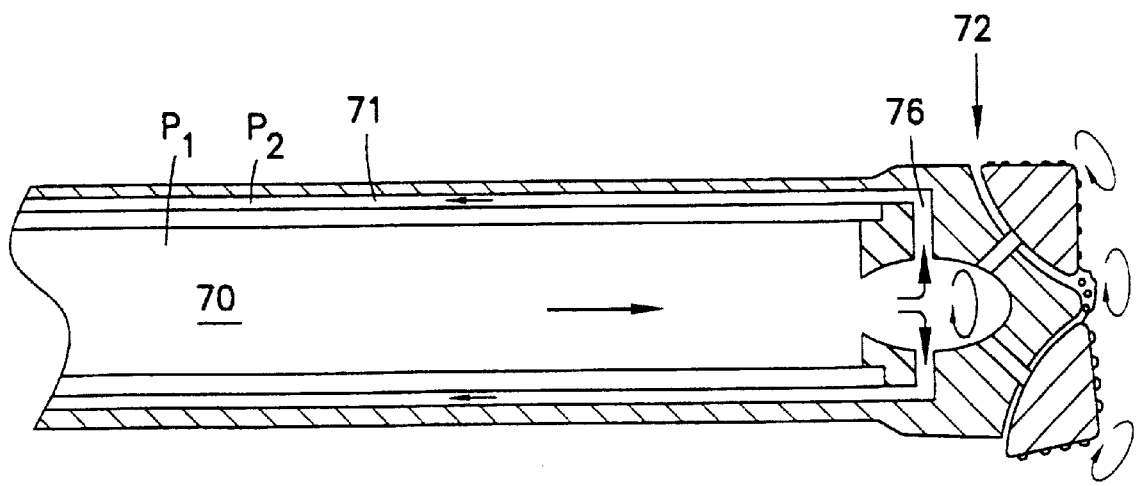
FIG. 16 is a side cutaway schematic view of a lined tubular and drill with circulating annular fluid.

In one embodiment, shown in FIG. 16, the path of the liner's interior 70 contains a fluid at high pressure $P_1$, and the annulus contains the same fluid at a lower pressure $P_2$. A practical application is the use of a high-efficiency hydraulic drill motor 72 at the downstream end of the tubular. Such motors may require clean fluids for their operation. FIG. 16 is a side cutaway schematic of a lined tubular and drill circulating annular fluid.

Figure 17:
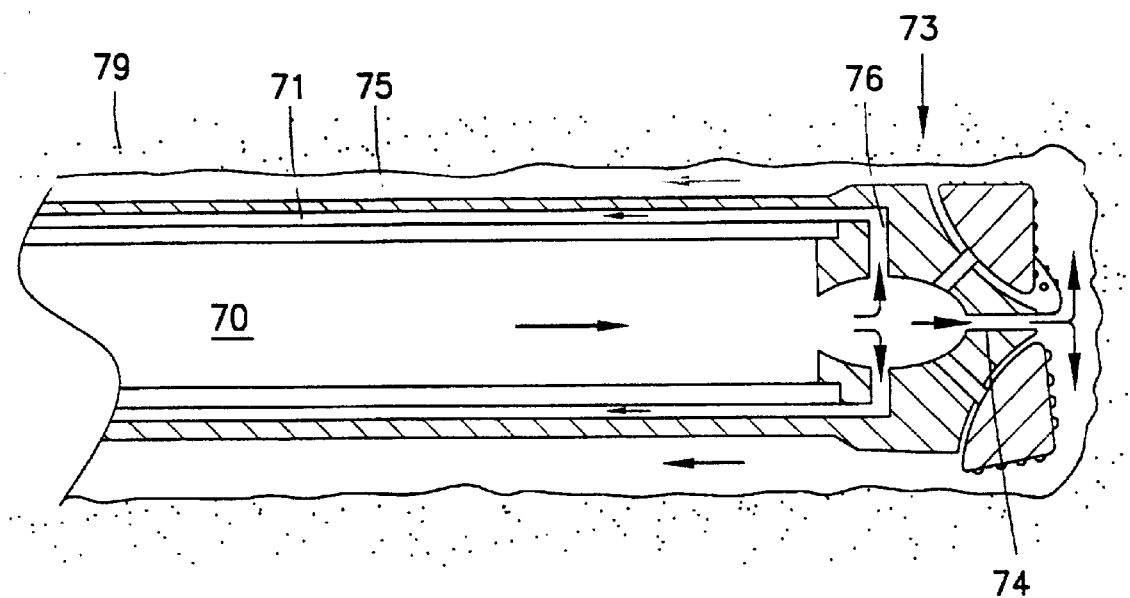
FIG. 17 is a side cutaway schematic view of another lined tubular and drill with circulating annular fluid.

In a related embodiment, the annular grooves 71 return only a portion of the fluid conveyed to the downstream end of the tubular. As previously, the fluid is used to power a drill motor 73. Drilling emulsion/mud, typical in the art, is used to power a motor and cool the bit surfaces. Part of the fluid exits the motor through a passage 74 and is returned along the exterior 75 of the composite tubular. However, the balance returns through the annulus 71. FIG. 17 is a side cutaway schematic of a lined tubular and drill circulating fluid. Porting of the fluid to the annulus can be accomplished through a passage 76 within the tubular-drill motor assembly as shown, or in an adjacent area (not shown).

Figure 18:
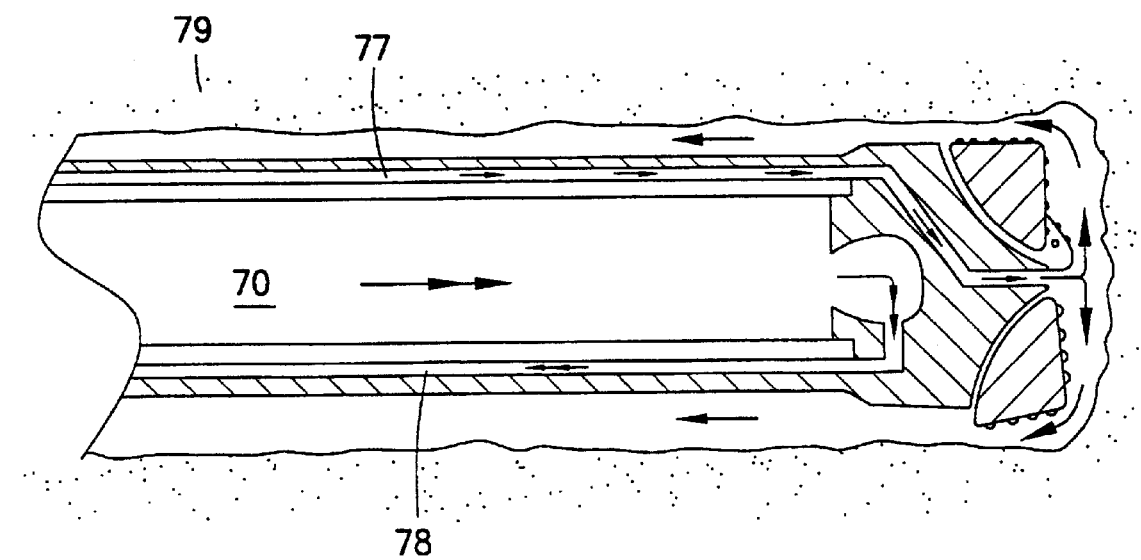
FIG. 18 is a side cutaway schematic view of a lined tubular and drill with two circulating fluids.

In yet another embodiment, multiple fluids may be circulated in the lined tubular having at least two continuous annuli 77 and 78. FIG. 18 is a side cutaway schematic of a lined tubular and drill circulating two fluids. In this case, the pressure of the fluid within the liner should be equal to or greater than that within the annulus. One fluid (e.g., hydraulic oil) in the bore 70 and the annulus 78 may be used to power a drill motor, and another (e.g., drilling mud) in the annulus 77 may be used to cool the bit and flush cuttings.

A particular advantage of the invention according to FIGS. 16 and 18 is in underbalanced drilling applications, where return drilling fluid, particularly at pressure, may damage the porosity of the geological formation 79 from which the hydrocarbons are produced.

The above-mentioned hydraulic drilling motor is only one example of a downhole hydraulic device that can be used with the lined tubular systems described herein. For example, the lined tubular system may be used to power a downhole cyclone for separating water and petroleum.

Another example is a downhole sensor, a seismic detector, or any other device that communicates or is driven hydraulically.

Another benefit unachievable with current liner systems is the location of blockages in a lined tubular system by manipulation of fluid in a continuous annulus. See FIGS. 19a–19i, which are a series of end and side cutaway views of lined tubulars with blockages. The utility of the invention is especially in the transport of produced hydrocarbons, particularly those lines which may be prone to blockage from paraffin deposition and/or gas hydrate formation.

The determination of the location of blockages may be accomplished in at least two ways using the annular fluid. First, volumetric measurement of expressed annular fluid can be performed in certain circumstances. Similarly, measurement of annular fluid flow rate conducted at a constant pressure can also be performed. Data gathered can be manipulated and mathematical interpolation will estimate the location of the blockage.

This is explained by the following process description. When a block is evident, the line is depressurized and vents on both ends of the suspected location are opened to environmental pressure $P_0$ (see FIG. 19a). The annular channels, relieved of stress, are thus permitted to expand to their maximum cross-sectional area $A_0$ (see FIGS. 19b and 19c). In the flow rate method, a baseline measurement using one or more predetermined pressures is taken, and the amount of fluid capable of passing through the annulus is determined as $Q_0$. In the volumetric measurement, nothing more is done at this stage.

Figure 19C:
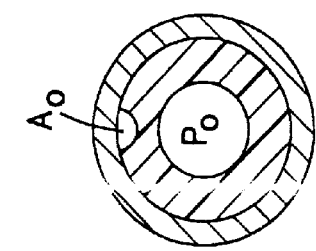
FIGS. 19a–19i are a series of end and side cutaway views showing conditions in lined tubulars with blockages.
Figure 19B:
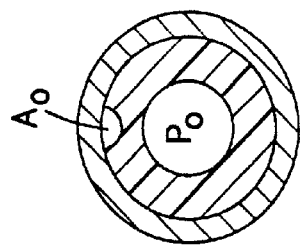
Figure 19A:
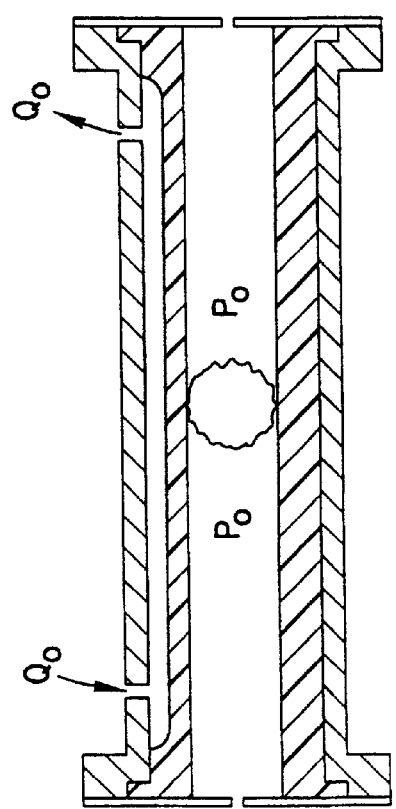
Figure 19F:
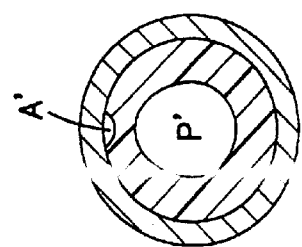
Figure 19E:
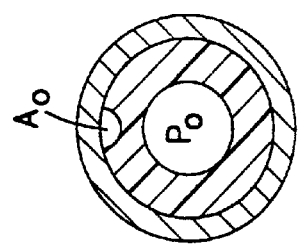
Figure 19D:
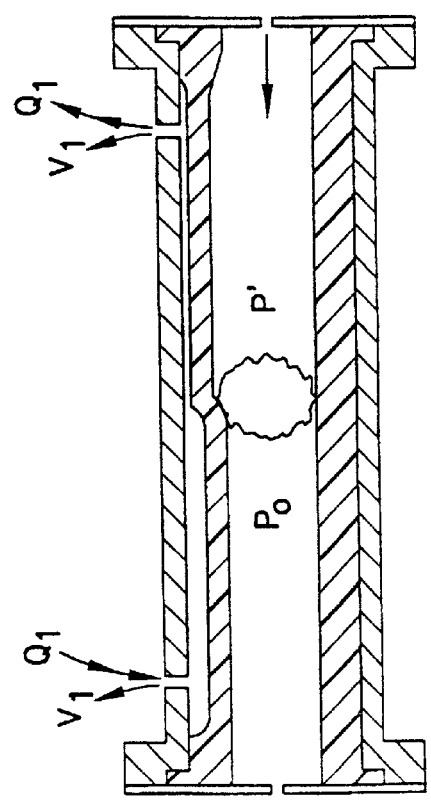

The line is then pressurized from one side of the blockage only (see FIGS. 19d). Provided the pathway(s) are unobstructed, the rise in internal pressure will create a reduction to A' in annular volume owing to the pressure P' on one side of the blockage only (see FIGS. 19e and 19f). In the flow rate method, the above process is repeated. Due to the reduced cross sectional area, the rate will be diminished, to $Q_1$. In the volumetric method, the annular fluid expelled upon repressurization is measured as $V_1$.

Figure 19I:
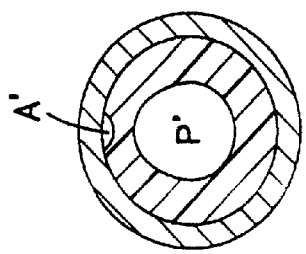
Figure 19H:
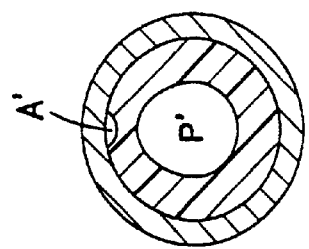
Figure 19G:
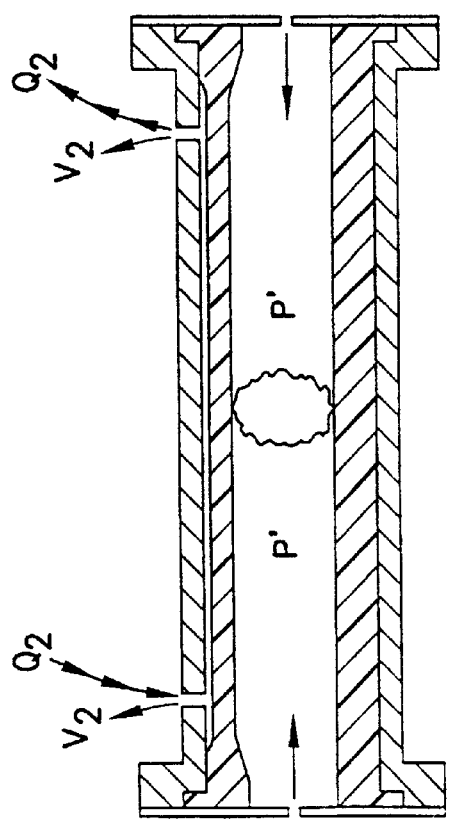

In the final step, the line pressure is equalized at P' on both sides of the blockage (see FIG. 19g) and the annular cross section is thereby minimized at A' (see FIGS. 19h and 19i). Repeating the process in the flow rate method, a further reduction will be seen, to $Q_2$. In the volumetric method, the remaining annular fluid expelled is measured, as $V_2$.

As the unit cross-section of the annular pathway is relatively consistent along the lined tubular for each of the embodiments, an interpolation of either volumetric, or flow rate method data can be made to approximate the position of the blockage.

In the volumetric method, $(V_1 \times \text{length of line})/(V_1+V_2)$=distance from initially pressurized end.

In the flow rate method, $((Q_0-Q_1) \times \text{length of line})/(Q_0-Q_2)$=distance from initially pressurized end.

Joining Systems

Figure 20:
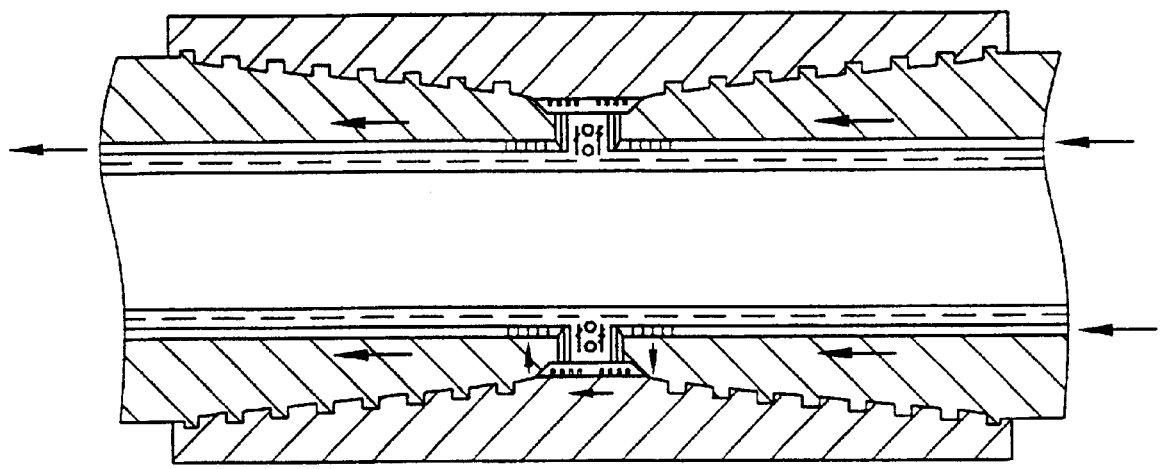
FIG. 20 is a side cutaway schematic view showing the use of a standard threaded coupling in an embodiment of the invention.

A number of joining systems are applicable to the present invention. A major prequalification of any effective joining system, for the enjoyment of the current invention, is the ready continuity of annular communication and fluid flow. Such designs may employ adaptations of common off-the-shelf connections, or may be custom-engineered. Embodiments illustrated are a standard threaded coupling (in FIG. 20 a side cutaway schematic). The tubulars' male-threaded ends are joined by a double-female coupling. Annular continuity is maintained within the joint. A snap-fit coupling is another type of standard coupling that can be used.

Figure 21:
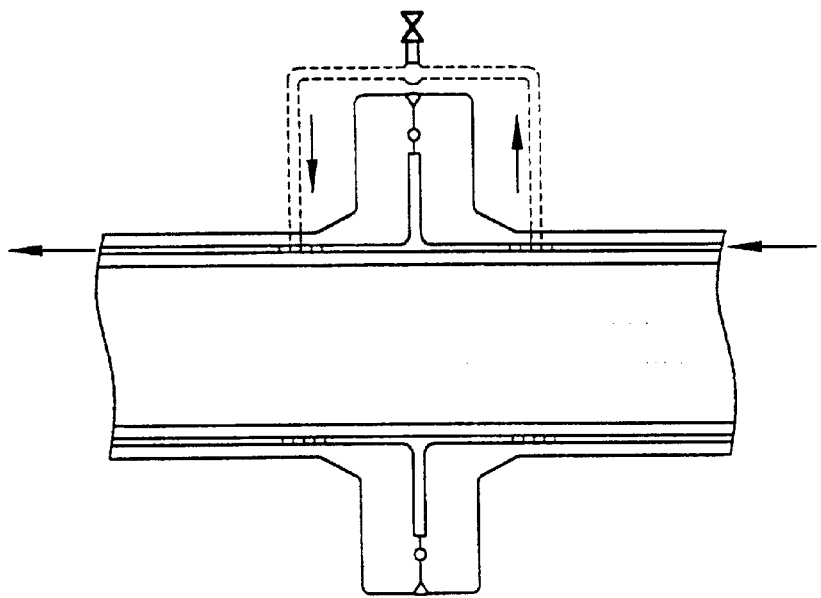
FIG. 21 is a side cutaway schematic view showing the use of a custom-engineered welded flange in an embodiment of the invention.

A custom-engineered welded flange is shown in FIG. 21, a side cutaway schematic. Annular continuity is provided by an exterior disposed loop.

In both cases, simple devices, e.g., screens, washers, tubing, etc., are employed to maintain annular continuity as required for the invention.

While certain preferred embodiments of the present invention have been disclosed in detail, it is to be understood that various modifications may be adopted without departing from the spirit of the invention.

What is claimed is:

1. A tubular system, comprising:
    a tubular;
    a liner in the tubular, the liner having an outer wall engaging an inner wall of the tubular, the liner having an inner wall defining a hollow bore;
    wherein said liner has a plurality of channels formed in said outer wall, said channels defining a corresponding plurality of fluid flow passages between said liner and said tubular;
    wherein at least two of said channels intersect each other; and
    wherein said channels have respective transverse cross-sectional shapes, at least two of said cross-sectional shapes being different.

2. A tubular system comprising:
    a tubular;
    a liner in the tubular, the liner having an outer wall engaging an inner wall of the tubular, the liner having an inner wall defining a hollow bore;
    wherein said liner has a plurality of channels formed in said outer wall, said channels defining a corresponding plurality of fluid flow passages between said liner and said tubular;
    wherein at least two of said channels intersect each other; and
    wherein said channels have respective transverse cross-sectional shapes, said cross-sectional shapes being substantially the same.

3. A tubular system comprising:
    a tubular;
    a liner in the tubular, the liner having an outer wall engaging an inner wall of the tubular, the liner having an inner wall defining a hollow bore;
    the liner having at least one channel formed in said outer wall, said channel defining a fluid flow passage between said liner and said tubular; and
    at least one non-crushable member disposed in said channel,
    said non-crushable member being generally in the shape of a helix, said helix having a longitudinal axis which extends along said channel, such that fluid flowing through said channel flows within said helix, along said longitudinal axis of said helix.

4. A tubular system according to claim 3, wherein said non-crushable member comprises solid material.

5. A tubular system according to claim 4, wherein said material is metal.

6. A tubular system according to claim 3, wherein said member is a helical spring.

7. A tubular system according to claim 3, wherein said non-crushable member permits fluid flow through said non-crushable member.

8. A tubular system according to claim 7, wherein said non-crushable member permits fluid flow through interstitial openings therein.

9. A tubular system according to claim 3, wherein said at least one non-crushable member is further disposed outside of said at least one channel and between said liner and said tubular, thereby deforming said liner and defining a fluid flow passage between said liner and said tubular.

10. A composite tubular system comprising:
    a host tubular;
    a polymeric liner located in the host tubular and in partial abutting contact with the host tubular; and
    a channel defined between the polymeric liner and the host tubular, the channel providing a path for the flow of an operational fluid;
    a port through the host tubular which controls the pressure of the operational fluid so that said pressure does not cause collapse of the liner;
    a tube coupled to the port and terminating at a point inside the liner; and
    a venturi nozzle on the end of the tube.

11. A composite tubular system comprising:
    a host tubular;
    a polymeric liner located in the host tubular and in partial abutting contact with the host tubular; and
    a channel defined between the polymeric liner and the host tubular, the channel providing a path for the flow of an operational fluid;
    a port through the host tubular which controls the pressure of the operational fluid so that said pressure does not cause collapse of the liner; and
    a pump coupled to the port; the pump providing sufficient pressure to the channel to maintain a minimum cross sectional area of the channel.

12. A composite tubular system comprising:
    a host tubular;
    a polymeric liner located in the host tubular and in partial abutting contact with the host tubular; and
    a channel defined between the polymeric liner and the host tubular;
    further comprising a non-compressible fluid filling the channel;
    wherein the non-compressible fluid is relatively insoluble with a second fluid disposed within the liner which may permeate through the liner to the channel.

13. A composite tubular system comprising:
    a host tubular;
    a polymeric liner located in the host tubular and in partial abutting contact with the host tubular; and
    a channel defined between the polymeric liner and the host tubular;
    further comprising a non-compressible fluid filling the channel; and
    an apparatus which generates a measuring-while-drilling signal, wherein the channel is capable of serving as a communications channel for the measuring-while-drilling signal.

14. In a composite tubular system comprising a host tubular of length L; a polymeric liner located in the host tubular and in partial abutting contact with the host tubular; and a channel defined between the polymeric liner and the host tubular, a method of determining the location of a blockage within the liner, said method comprising the steps of:

a) depressurizing the channel and the volume within the liner;

b) impressing a differential pressure along the channel;

c) measuring a baseline flowrate through the channel at the differential pressure, the baseline flowrate being defined as $Q_0$;

d) pressurizing the volume from one end of the liner to the blockage within the liner, the length of that end of the volume within the liner being defined as the location to be determined;

e) measuring a first test flowrate through the channel with said one end of the volume pressurized, the first test flowrate being defined as $Q_1$;

f) pressuring the other end of the volume within the liner;

g) measuring a second test flowrate through the channel with both ends of the liner pressurized, the second test flowrate being defined as $Q_2$; and h) calculating the location of the blockage with the following formula:

$$((Q_0-Q_1) \times L)/(Q_0-Q_2) = \text{the distance of the blockage from the initially pressurized end.}$$

15. The method of claim 14, further comprising the steps of:

measuring a first volume of fluid expelled in step (c), the first volume being defined as $V_1$;

measuring a second volume of liquid expelled in step (g), the second volume being defined as $V_2$; and calculating the location of the blockage with the following formula;

$$(V_1 \times L)/(V_1+V_2) = \text{the distance of the blockage from the initially pressurized end.}$$

16. A composite tubular system comprising:

a host tubular;

a polymeric liner located in the host tubular and in partial abutting contact with the host tubular; and a channel defined between the polymeric liner and the host tubular, the channel providing a flow path for an operational fluid;

a port formed in the host tubular, a tube coupled to the port and terminating at a point inside the liner, and a Venturi nozzle disposed inside the liner on the end of the tube; and a pump coupled to the port which controls the pressure of the operational fluid in the channel so that said pressure does not cause collapse of the liner.

17. The system of claim 16, further comprising a riser coupled to the port; and an accumulator coupled to the riser; the pump being coupled to the accumulator.

18. A composite tubular system comprising:

a host tubular;

a polymeric liner located in the host tubular and in partial abutting contact with the host tubular; and a channel defined between the polymeric liner and the host tubular;

a non-compressible fluid filling the channel, the non-compressible fluid being relatively insoluble with a second fluid disposed within the liner which may permeate through the liner to the channel.

* * * * *